United States Patent [19]

Aagano et al.

[11] Patent Number: 4,642,462
[45] Date of Patent: Feb. 10, 1987

[54] METHOD OF CORRECTING RADIATION IMAGE READ-OUT ERROR

[75] Inventors: Toshitaka Aagano; Yoshimi Takasaki, both of Kaisei, Japan

[73] Assignee: Fuji Photo Film Co., Ltd., Japan

[21] Appl. No.: 631,844

[22] Filed: Jul. 18, 1984

[30] Foreign Application Priority Data

Jul. 19, 1983 [JP] Japan .............. 58-131566

[51] Int. Cl.$^4$ .................................. G03G 5/16
[52] U.S. Cl. ................. 250/327.2; 250/484.1
[58] Field of Search ............ 250/327.2, 484.1, 334, 250/572, 563; 356/431; 350/6.8; 358/293

[56] References Cited

U.S. PATENT DOCUMENTS

| | | | |
|---|---|---|---|
| 4,195,316 | 3/1980 | Sansome | 350/6.8 |
| 4,258,264 | 3/1981 | Kotera et al. | 250/484.1 |
| 4,318,582 | 3/1982 | Minoura et al. | 350/6.8 |
| 4,404,596 | 9/1983 | Juergensen et al. | 358/293 |
| 4,484,073 | 11/1984 | Ohara et al. | 250/327.2 |

Primary Examiner—Janice A. Howell
Attorney, Agent, or Firm—Pasquale A. Razzano

[57] ABSTRACT

In a radiation image read-out system, a stimulable phosphor sheet carrying a radiation image stored therein is two-dimensionally scanned with stimulating rays, with the main scanning being effected by use of a multifaceted mirror having a plurality of deflecting surfaces. Light emitted by the stimulable phosphor sheet upon exposure to the stimulating rays is detected and converted into an electric image signal. When any of the deflecting surfaces is inclined from its predetermined position, the electric image signal obtained from the scan line drawn by the inclined deflecting surface becomes incorrect. The electric image signal obtained from the scan line drawn by the inclined deflecting surface is corrected by use of a correction coefficient which is predetermined for each deflecting surface according to the amount of inclination from the predetermined position thereof.

5 Claims, 3 Drawing Figures

METHOD OF CORRECTING RADIATION IMAGE READ-OUT ERROR

BACKGROUND OF THE INVENTION

1. Field of the Invention

This invention relates to a method of correcting a read-out error of image signals read out by scanning a stimulable phosphor sheet carrying a radiation image stored therein, and more particularly to a method of correcting an image signal read-out error caused, when a stimulable phosphor sheet carrying a radiation transmission image stored therein is scanned by stimulating rays by use of a multifaceted deflector such as a multifaceted mirror or a hologram scanner and light emitted by the stimulable phosphor sheet in proportion to the stored radiation energy upon exposure to the stimulating rays is photoelectrically read out and converted into image signals, by distortion and/or shift in scan lines due to unevenness in the surfaces of the multifaceted deflector and/or incorrect orientation of the surfaces of the same.

2. Description of the Prior Art

When certain kinds of phosphors are exposed to a radiation such as X-rays, $\alpha$-rays, $\beta$-rays, $\gamma$-rays or ultra-violet rays, they store a part of the energy of the radiation. Then when the phosphor which has been exposed to the radiation is exposed to stimulating rays such as visible light, light is emitted by the phosphor in proportion to the stored energy of the radiation. A phosphor exhibiting such properties is referred to as "a stimulable phosphor".

It has been proposed, for instance, in U.S. Pat. No. 4,258,264 and Japanese Unexamined Patent Publication No. 56(1981)-11395, to use a stimulable phosphor in a radiation image recording and reproducing system. Specifically, a sheet provided with a layer of the stimulable phosphor (hereinafter referred to as "a stimulable phosphor sheet" or simply as "a sheet") is first exposed to a radiation passing through an object such as a human body to have a radiation image stored therein, and is then scanned with stimulating rays such as a laser beam which cause it to emit light in the pattern of the stored image. The light emitted by the stimulable phosphor sheet upon stimulation thereof is photoelectrically detected and converted into an electric image signal, which is processed as desired to reproduce a visible image on a recording medium such as a photographic light-sensitive material or on a display device such as a cathode ray tube (CRT).

Generally the stimulating laser beam is deflected to scan the stimulable phosphor sheet by a multifaceted deflector or a galvanometer mirror. In case that a multifaceted deflector is employed, there arises a problem that if the orientation of the deflecting surfaces is not correct or if there is unevenness in the deflecting surfaces, the positional relationship between adjacent scan lines becomes incorrect and an image signal read-out error is caused. That is, if the orientation of the deflecting surfaces of the multifaceted deflector is not proper, the center to center distances between adjacent scan lines fluctuate, which leads to an image signal read-out error as will be described in more detail hereinbelow. Further, unevenness in the surfaces of the multifaceted deflector causes distortion of the scan lines, which also leads to an image signal read-out error.

Since the width of each scan line is very small, e.g., about 100 $\mu$m, the orientation of each surface of the multifaceted deflector and the surface evenness thereof must be controlled very precisely. Though the surface evenness of each surface of the multifaceted deflector can be controlled to such an extent to permit obtaining substantially straight scan lines having a width of approximately 100 $\mu$m, it is very difficult to manufacture a multifaceted deflector having properly oriented deflecting surfaces in which the angle of inclination of each surface from its predetermined position with respect to the rotational axis thereof (This angle will be simply referred to as "the inclining angle", hereinbelow.) is smaller than about 5 seconds. When the inclining angle of each deflecting surface of the multifaceted deflector is 5" or more, the scan line drawn on the stimulable phosphor sheet by the deflecting surface is shifted by some dozen $\mu$m from the position in which it would be drawn if the inclining angle of the deflecting surface were zero. The shift of some dozen $\mu$m of the scan line substantially influences the value of the obtained image signal as can be readily understood from the fact that the width of each scan line is as small as 100 $\mu$m.

Conventionally, an optical means such as a light deflector or a cylindrical lens has been used for adjusting the incident angle or the reflecting angle of the stimulating laser beam with respect to the multifaceted deflector, thereby compensating for the incorrect orientation of the deflecting surfaces of the multifaceted deflector. However, when the light deflector is used for such a purpose, the light deflector must be controlled in synchronization with each deflecting surface of the multifaceted deflector, and when other optical means is used, the structure of the system becomes complicated. Therefore, it has been difficult to minimize the size of the system and to reduce the manufacturing cost thereof.

SUMMARY OF THE INVENTION

In view of the foregoing observations and description, the primary object of the present invention is to provide an improved method of correcting a read-out error of image signals read-out by scanning a stimulable phosphor sheet carrying a radiation image stored therein which can compensate for incorrect orientation of the deflecting surfaces of the multifaceted deflector without complicating the structure of the radiation image recording reproducing system, whereby the system can be minimized in size and can be manufactured at low cost.

In accordance with the present invention, the electric image signal is corrected by use of a correction coefficient which is predetermined for each deflecting surface of the multifaceted deflector. That is, the electric image signal obtained from a scan line drawn by a certain deflecting surface is multiplied by a correction coefficient predetermined for the deflecting surface. The correction coefficient for each deflecting surface can be determined either experimentally or mathematically.

DETAILED DESCRIPTION OF THE INVENTION

Figure 1:
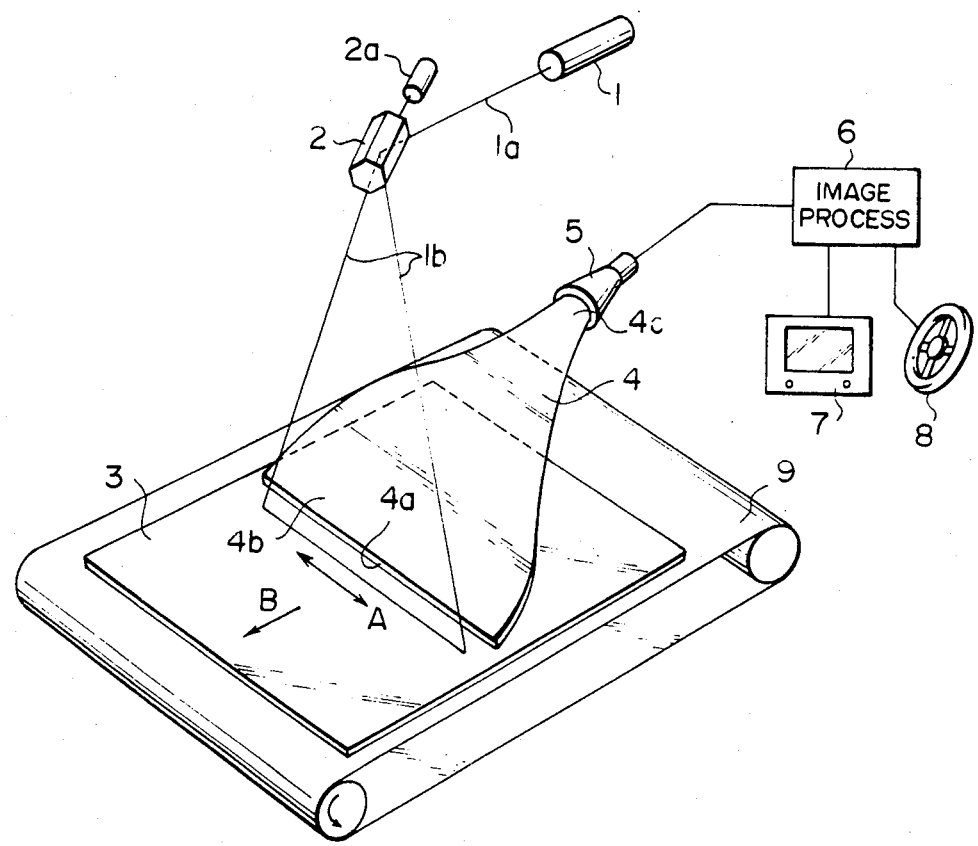
FIG. 1 is a schematic perspective view of an example of a radiation image read-out apparatus.

FIG. 1 is a schematic view showing an example of a radiation image read-out apparatus adapted to be employed in the radiation image recording and reproducing system.

In FIG. 1, a laser beam 1a having a predetermined intensity is emitted by a laser beam source 1 to impinge upon a multifaceted mirror 2 which is rotated at a predetermined speed by an electric motor 2a. The laser beam 1a is deflected by the multifaceted mirror 2 to form a scanning laser beam 1b which scans a stimulable phosphor sheet 3 in the main scanning direction or the direction of the width thereof as shown by the arrow A. While the scanning laser beam 1b impinges upon the stimulable phosphor sheet 3, the sheet 3 is conveyed at a predetermined speed in a sub-scanning direction perpendicular to the main-scanning direction as indicated by the arrow B, for example, by an endless belt device 9, whereby the sheet 3 is two-dimensionally scanned with the scanning laser beam 1b. As the stimulable phosphor sheet 3 is scanned with the scanning laser beam 1b, the portion of the sheet 3 exposed to the scanning laser beam 1b emits light having an intensity proportional to the radiation energy stored. The light emitted by the sheet 3 enters a transparent light guide member 4 from its front end face 4a positioned close to the sheet 3 in parallel to the main-scanning line. The light guide member 4 has a flat-shaped front end portion 4b positioned close to the sheet 3 and is shaped gradually into a cylindrical shape toward its rear end to form a substantially cylindrical rear end portion 4c which is closely contacted with a photomultiplier 5. The light emitted by the stimulable phosphor sheet 3 upon stimulation thereof and entering the light guide member 4 from its front end face 4a is guided inside of the light guide member 4 up to the rear end portion 4c, and received by the photomultiplier 5. Thus, the light emitted by the stimulable phosphor sheet 3 in proportion to the radiation energy stored therein is detected and converted into an electric image signal by the photomultiplier 5. The electric image signal thus obtained is sent to an image processing circuit 6 to be processed therein. The processed image signal may be reproduced into a visible image on a CRT 7 or may be stored in a magnetic recording tape 8. If desired, a hard copy can be obtained on a photographic light-sensitive material from the processed image signal.

Figure 2:
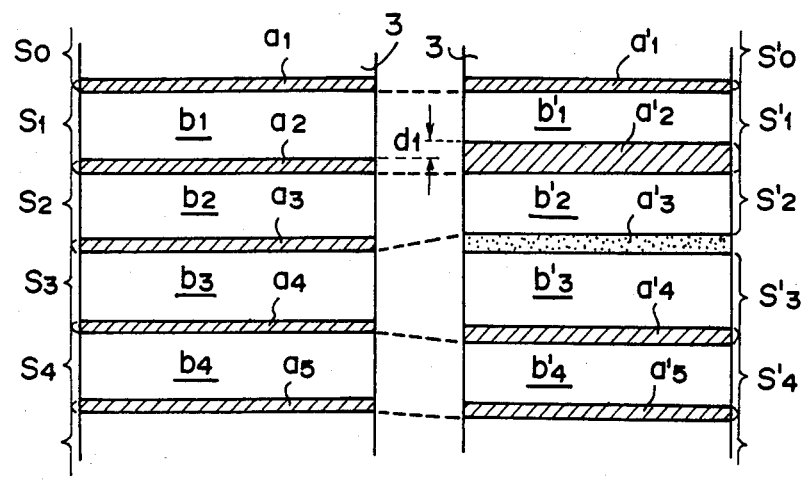
FIG. 2 is a schematic view for illustrating the manner of determining the correction coefficient for each of the deflecting surfaces of the multifaceted mirror when the scan lines are intended to be arranged so that adjacent scan lines overlap each other.
Figure 3:
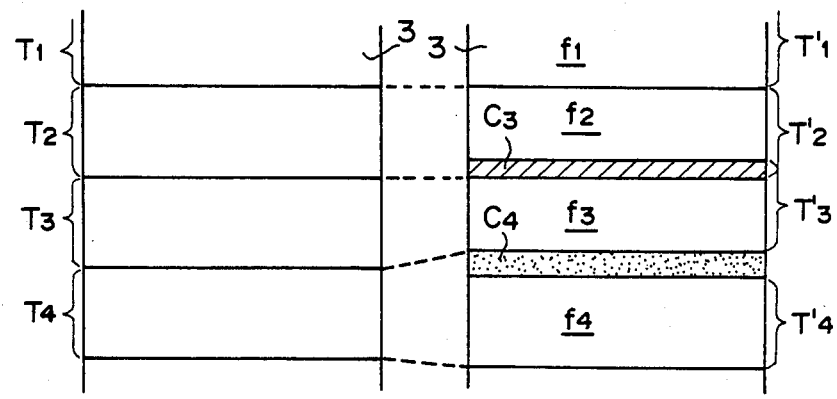
FIG. 3 is a schematic view similar to FIG. 2 but when the scan lines are intended to arranged so that adjacent scan lines adjoin side by side with each other.

When a radiation transmission image stored in the stimulable phosphor sheet 3 is read out in the manner described above, one scan line is drawn on the sheet 3 by each deflecting surface of the multifaceted mirror 2. The scan lines are intended to be positioned so that adjacent scan lines overlap each other by a predetermined width as shown in the left side part of FIG. 2 or adjoin side by side with each other as shown in the left side part of FIG. 3. That is, the left side parts of FIGS. 2 and 3 show arrangements of scan lines when the orientation of all the deflecting surfaces of the multifaceted mirror 2 is proper, respectively for the case that the scan lines are intended to be arranged to overlap each other and for the case that the scan lines are intended to be arranged to adjoin side by side with each other.

The former case will be first described with reference to FIG. 2. The right side part of FIG. 2 shows an example of the arrangement of the scan lines when some of the deflecting surfaces of the multifaceted mirror 2 are improperly oriented. As shown in the left side part of FIG. 2, when all the deflecting surfaces are properly oriented, the scan lines are regularly formed as indicated at S0 to S4 with the center to center distances between adjacent scan lines being uniform and the overlapping portions a1 to a5 between adjacent scan lines being uniform in width. Accordingly, the "non-overlapping portions" b1 to b4 of the respective scan lines S0 to S4 are uniform in width.

Since when a part of the stimulable phosphor sheet 3 is exposed to the stimulating laser beam 1b, the radiation energy stored in the part of the sheet 3 is exhausted (Though generally the radiation energy stored in a given part of the sheet 3 cannot be completely exhausted by a single stimulation, it is here assumed to be for the purpose of simplification of explanation.), the electric image signal obtained from a certain scan line corresponds to the amount of light emitted by the part of the stimulable phosphor sheet 3 corresponding to the non-overlapping portion and the rear overlapping portion (the overlapping portion between the scan line and the next scan line). For example, the image signal obtained from the scan line S2 corresponds to the amount of light emitted by the part of the stimulable phosphor sheet 3 corresponding to the non-overlapping portion b2 and the rear overlapping portion a3 since the radiation energy stored in the front overlapping portion a2 has been exhausted through scanning of the stimulating laser beam b1 along the preceding scan line S1.

That is, the amount of light emitted by the part of the stimulable phosphor sheet 3 along each scan line is proportional to the amount of radiation energy stored therein and to the total width or the total area of the non-overlapping portion, e.g., b2 and the rear overlapping portion, e.g., a3 provided that the power distribution of the stimulating laser beam 1b is uniform. Therefore, if the total width of the non-overlapping portion and the rear overlapping portion (determined by the width of the front overlapping portion, after all) fluctuates, the obtained electric image signal becomes incorrect.

On the other hand, when some of the deflecting surfaces of the multifaceted mirror 2 are improperly oriented, the scan lines drawn by the improperly oriented deflecting surfaces are shifted in the sub-scanning direction and the center to center distances between adjacent scan lines fluctuate, whereby the widths of the overlapping portions between adjacent scan lines fluctuate and sometimes a space is formed between adjacent scan lines as shown in the right side part of FIG. 2. In the right side part of FIG. 2, the scan lines are indicated at S'0 to S'4 and the overlapping portions are indicated at a'1 to a'5 with the exception that a'3 denotes a space, or a portion which is not covered with the scan lines. The width of each scan line is equal to that of the scan lines shown in the left side part of FIG. 2. The deflecting surfaces of the multifaceted mirror 2 for drawing the scan lines S'0 and S'1 are properly oriented and accordingly the scan lines S'0 and S'1 are positioned in the respective desired positions. Therefore, the width of the front overlapping portion a'1 is equal to that of the regular scan line, e.g., the width of the overlapping portion a1, and accordingly the total width or area of the non-overlapping portion b'1 and the rear overlapping portion a′2 which is equal to the value obtained by subtracting the width of the front overlapping portion a′1 from the entire width of the scan line S′1, is equal to that of the regular scan line, e.g., the total width of the non-overlapping portion b1 and the rear overlapping portion a2. Therefore, the electric image signal obtained from the scan line S′1 need not be corrected. Thus, the correction coefficient k1 for the deflecting surface drawing the scan line S′1 is determined to be unity. The area obtained by subtracting the area of the front overlapping portion from the entire area of each scan line, i.e., the area of the scan line which actually contributes to emission of light by the sheet, will be referred to as "the effective area", hereinafter.

The scan line S′2 is shifted toward the scan line S′1 by distance d1, and accordingly the front overlapping portion a′2 is wider than the regular width by d1. Further, the scan line S′3 is shifted away from the scan line S′2, and the overlapping portion a′3 therebetween has negative width, that is, the scan lines S′2 and S′3 are spaced away from each other. The total width of the area of the non-overlapping portion b′2 and the rear overlapping portion a′3 (=0) of the scan line S′2, i.e., the effective area of the scan line S′2 is reduced by d1. Accordingly, the amount of light emitted by the stimulable phosphor sheet 3 upon scanning along the scan line S′2 becomes smaller than that of light emitted by the sheet 3 upon scanning along the scan line S′1 even if the amount of radiation energy stored in the parts of the sheet 3 corresponding to the scan lines S′1 and S′2 are equal. Thus, the electric image signal obtained from the scan line S′2 must be corrected taking into account the reduction in effective area of the scan line S′2. In this case, correction coefficient k2 for the deflecting surface drawing the scan line S′2 is selected as a value which produces the effective area of the regular scan line when multiplied by the effective area of the scan line S′2. That is, $Rs=k2\times b'2$ wherein Rs represents the effective area of the regular scan line, e.g., b1+a2. If the intensity of light emitted by the part of the sheet 3 corresponding to the scan line S′2 changes by a large amount in the direction of width of the scan line, the image signal obtained by use of the correction coefficient is not correct. However since the width of the scan line is very small and the change in the intensity in the direction of width of the scan line is negligible on one scan line, the value of the image signal obtained by use of the correction coefficient may be considered to be correct.

The scan line S′3 is shifted away from the scan line S′2 and has no front overlapping portion. Therefore, the effective area of the scan line S′3 is the entire area thereof and larger than the effective area of the regular scan line. Accordingly, correction coefficient k3 for the deflecting surface drawing the scan line S′3 is selected so that the product of the correction coefficient and the entire area of the scan line S′3 is equal to the effective area of the regular scan line. Therefore, the value of the correction coefficient k3 is smaller than unity.

In accordance with the present invention, image signal read-out errors due to incorrect orientation of the deflecting surfaces of the multifaceted mirror can be corrected by simply multiplying the electric image signal read out from each scan line by the correction coefficient which is thus determined and is specific to the deflecting surface drawing the scan line. All the electric image signals for the picture elements on one scan line are corrected by the same correction coefficient.

Practically, each correction coefficient may be mathematically determined by measuring the inclining angle of each deflecting surface, or may be determined by reading out electric image signals upon scanning a stimulable phosphor sheet which has been uniformly exposed to a radiation and determining the correction coefficients so that the electric image signals read out from all the scan lines become equal to each other in level.

The left side part of FIG. 3 shows the arrangement of scan lines when the scan lines are intended to be arranged to adjoin side by side with each other without space or overlapping portion therebetween and it is assumed that all the deflecting surfaces are properly oriented. That is, the scan lines T1, T2, T3, T4 . . . are regularly formed adjoining side by side with each other. The right side part of FIG. 3 shows an example of the arrangement of scan lines when some of the deflecting surfaces of the multifaceted mirror are improperly oriented. It is assumed that scan lines T′1, T′2, T′3 and T′4 in the right side part of FIG. 3 are drawn by first to fourth deflecting surfaces of the multifaceted mirror 2, respectively.

Generally, when the value of an electric image signal obtained from the k-th scan line Tk is represented by Rk and the value of the corrected signal obtained by correcting the Rk according to the inclining angle of the k-th deflecting surface of the multifaceted mirror which draws the k-th scan line is represented by Sk, the correction coefficient Fk for the k-th deflecting surface may be of a value which satisfies the following formula.

$$Sk=Rk+Fk\times Sk-1$$

In FIG. 3, the scan lines T′1 and T′2 adjoin side by side with each other without any overlapping portion or a space therebetween. Accordingly, the effective area of the scan line T′2 is the entire area thereof and is equal to the effective area of the regular scan line, e.g., T1. Therefore, the electric image signal R2 obtained from the scan line T′2 need not be corrected. Thus, the correction coefficient F2 for the second deflecting surface of the multifaceted mirror is determined to be zero. That is, S2=R2.

The scan line T′3 overlaps with the scan line T′2 at its front part as indicated at c3. Therefore, the effective area of the scan line T′3 indicated at f3 is smaller than the effective area of the regular scan line by the area of the overlapping portion c3. In this case, the value of the signal C3 corresponding to the overlapping portion c3 is approximately calculated from the corrected value S2 of the signal obtained from the previous scan line T′2 and is added to the value R3 of the signal obtained from the effective area of the scan line T′3, thereby obtaining corrected value S3. That is, $$C3=S2\times c3/(f2+c3)$$

Accordingly, S3=R3+C3. The value of the c3/(f2+c3) is determined by the inclining angle of the third deflecting surface of the multifaceted mirror. When this value is represented by F3, the following formula is satisfied.

$$S3=R3+F3\times S2$$

The scan line T′4 is spaced away from the previous scan line T′3, accordingly the image information stored in the part of the sheet 3 corresponding to the space c4 between the scan lines T'3 and T'4 is not read out. However, the width of the space c4 is very small and any change in the image information within its width is negligible. Accordingly, the value R4 of the electric image signal obtained from the scan line T'4 may used without correction. That is, the correction coefficient F4 for the fourth deflecting surface of the multifaceted mirror is determined to be zero. That is, S4=R4.

In accordance with the present invention, the image signal read-out error due to improper orientation of the deflecting surfaces of the multifaceted deflector can be corrected through calculation and no optical means is required for correction of such read-out errors. Therefore, the size and manufacturing cost of the system can be substantially reduced.

We claim:

1. A method of correcting a radiation image readout error comprising steps of two-dimensionally scanning a stimulable phosphor sheet carrying a radiation transmission image stored therein with stimulating rays in a main scanning direction and a sub-scanning direction, the main scanning being effected by use of a multifaceted deflector having a plurality of deflecting surfaces, photoelectrically detecting light emitted by said stimulable phosphor sheet upon stimulation thereof by the stimulating rays to convert the light emitted by the stimulable phosphor sheet to an electric image signal, and correcting the electric image signal obtained from each main scan line by use of a correction coefficient which is predetermined for each main scan line according to the amount of shift of the main scan line from the predetermined position thereof in the sub-scanning direction.

2. A method as defined in claim 1 in which said shift of the main scan line in the sub-scanning direction is due to improper orientation of the deflecting surface drawing the main scan line and said correction coefficient is predetermined for each deflecting surface according to the amount of inclination of each deflecting surface from its predetermined position.

3. A method as defined in claim 1 in which said electric image signal is corrected by use of said correction coefficient so as to be increased when the center to center distance between said scan line and the previous scan line is smaller than a predetermined value and so as to be decreased or uncorrected when said distance is larger than the predetermined value.

4. A method as defined in claim 3 in which said electric image signal is corrected by being multiplied by said correction coefficient.

5. A method as defined in claim 3 in which said electric image signal is corrected by adding thereto a correction value obtained by multiplying the corrected electric image signal of the previous scan by said correction coefficient.

* * * * *